United States Patent
Wampler et al.

(10) Patent No.: US 7,717,151 B2
(45) Date of Patent: *May 18, 2010

(54) MATERIAL PLACEMENT METHOD AND APPARATUS

(75) Inventors: Robert Ray Wampler, Augusta, KS (US); Muhammad Zia Ullah, Wichita, KS (US)

(73) Assignee: Spirit Aerosystems, Inc., Wichita, KS (US)

( * ) Notice: Subject to any disclaimer, the term of this patent is extended or adjusted under 35 U.S.C. 154(b) by 199 days.

This patent is subject to a terminal disclaimer.

(21) Appl. No.: 11/947,573

(22) Filed: Nov. 29, 2007

(65) Prior Publication Data

US 2009/0139654 A1    Jun. 4, 2009

(51) Int. Cl.
*B32B 37/00*    (2006.01)
*B44C 7/00*    (2006.01)

(52) U.S. Cl. .................. 156/523; 156/574; 156/577

(58) Field of Classification Search ........... 156/23–527, 156/574–577
See application file for complete search history.

(56) References Cited

U.S. PATENT DOCUMENTS

| | | | | |
|---|---|---|---|---|
| 3,908,978 A | * | 9/1975 | Stemmle | 270/58.01 |
| 3,992,240 A | | 11/1976 | Kuehn, Jr. | |
| 4,234,374 A | | 11/1980 | Frank | |
| 4,259,144 A | | 3/1981 | Ballentine | |
| 4,292,108 A | | 9/1981 | Weiss et al. | |
| 4,351,688 A | | 9/1982 | Weiss et al. | |
| 4,560,433 A | * | 12/1985 | Frank | 156/459 |
| 4,750,965 A | * | 6/1988 | Pippel et al. | 156/361 |
| 4,822,444 A | * | 4/1989 | Weingart et al. | 156/441 |
| 5,022,952 A | | 6/1991 | Vaniglia | |
| 5,088,722 A | * | 2/1992 | Olexy | 271/304 |
| 5,110,395 A | | 5/1992 | Vaniglia | |
| 5,223,072 A | | 6/1993 | Brockman et al. | |
| 5,290,389 A | * | 3/1994 | Shupe et al. | 156/425 |
| 5,454,897 A | | 10/1995 | Vaniglia | |
| 5,954,917 A | | 9/1999 | Jackson et al. | |
| 5,979,531 A | * | 11/1999 | Barr et al. | 156/574 |
| 6,086,696 A | | 7/2000 | Gallagher | |
| 6,096,164 A | | 8/2000 | Benson et al. | |
| 6,390,169 B1 | | 5/2002 | Johnson | |
| 6,544,367 B1 | * | 4/2003 | Fujimoto et al. | 156/187 |
| 6,814,822 B2 | | 11/2004 | Holmes et al. | |
| 7,048,024 B2 | | 5/2006 | Clark et al. | |

(Continued)

FOREIGN PATENT DOCUMENTS

WO    WO 2005/018917    3/2005

*Primary Examiner*—Kat Wyrozebski
*Assistant Examiner*—Scott W Dodds
(74) *Attorney, Agent, or Firm*—Hovey Williams LLP

(57) ABSTRACT

A material placement head for dispensing and compacting a plurality of strips of a material onto a surface with a plurality of independently movable roller assemblies. Each roller assembly of the placement head comprises a compacting roller and may be rotatably and linearly moved in six-degrees of freedom independent of the other roller assemblies of the placement head. The roller assemblies may be arranged in a staggered configuration and substantially simultaneously apply the plurality of strips of the material to the surface, such that the strips of the material are applied to adjacent paths on the surface. Each compacting roller may be malleable and substantially crowned around its outer circumferential surface to provide even compaction to the strips of the material.

7 Claims, 10 Drawing Sheets

U.S. PATENT DOCUMENTS

| | | |
|---|---|---|
| 7,063,118 B2 | 6/2006 | Hauber et al. |
| 7,080,441 B2 | 7/2006 | Braun |
| 7,083,698 B2 | 8/2006 | Engwall et al. |
| 7,137,182 B2 | 11/2006 | Nelson |
| 2005/0039843 A1* | 2/2005 | Johnson et al. ............. 156/175 |
| 2005/0061422 A1 | 3/2005 | Martin |
| 2006/0180264 A1 | 8/2006 | Kisch et al. |
| 2007/0029038 A1 | 2/2007 | Brown et al. |
| 2007/0044899 A1 | 3/2007 | Tingley |
| 2007/0044922 A1 | 3/2007 | Mischler et al. |

* cited by examiner

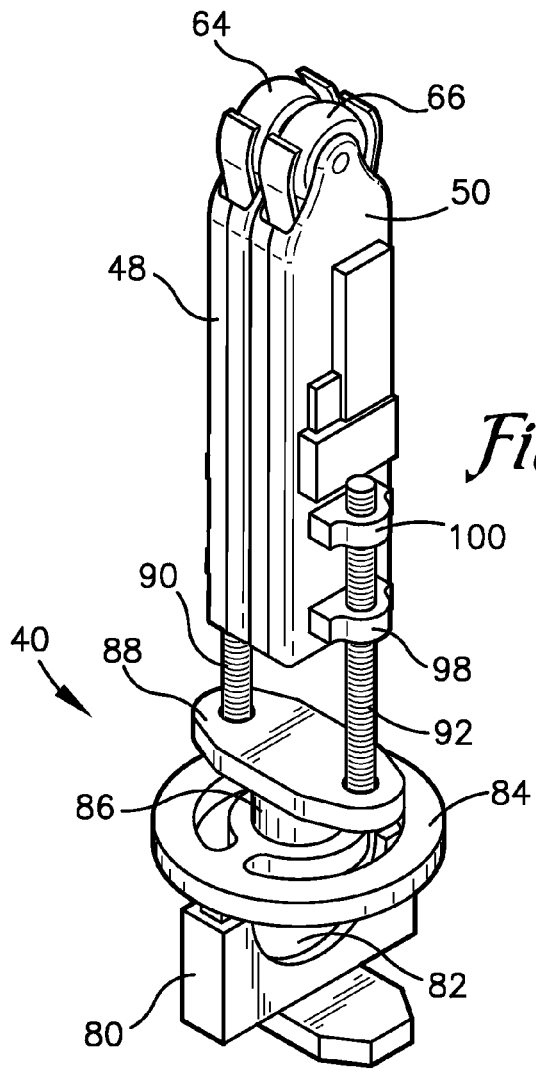
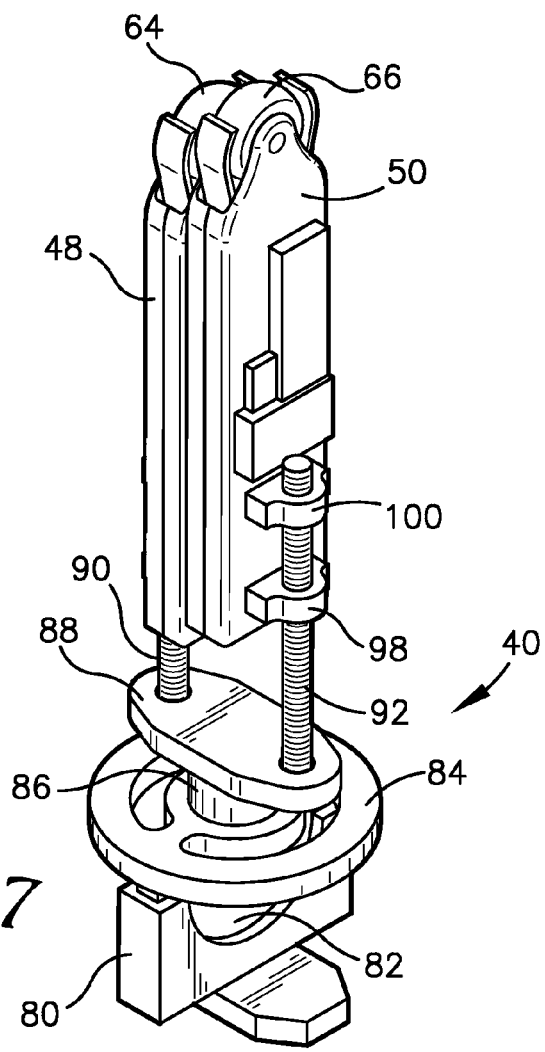

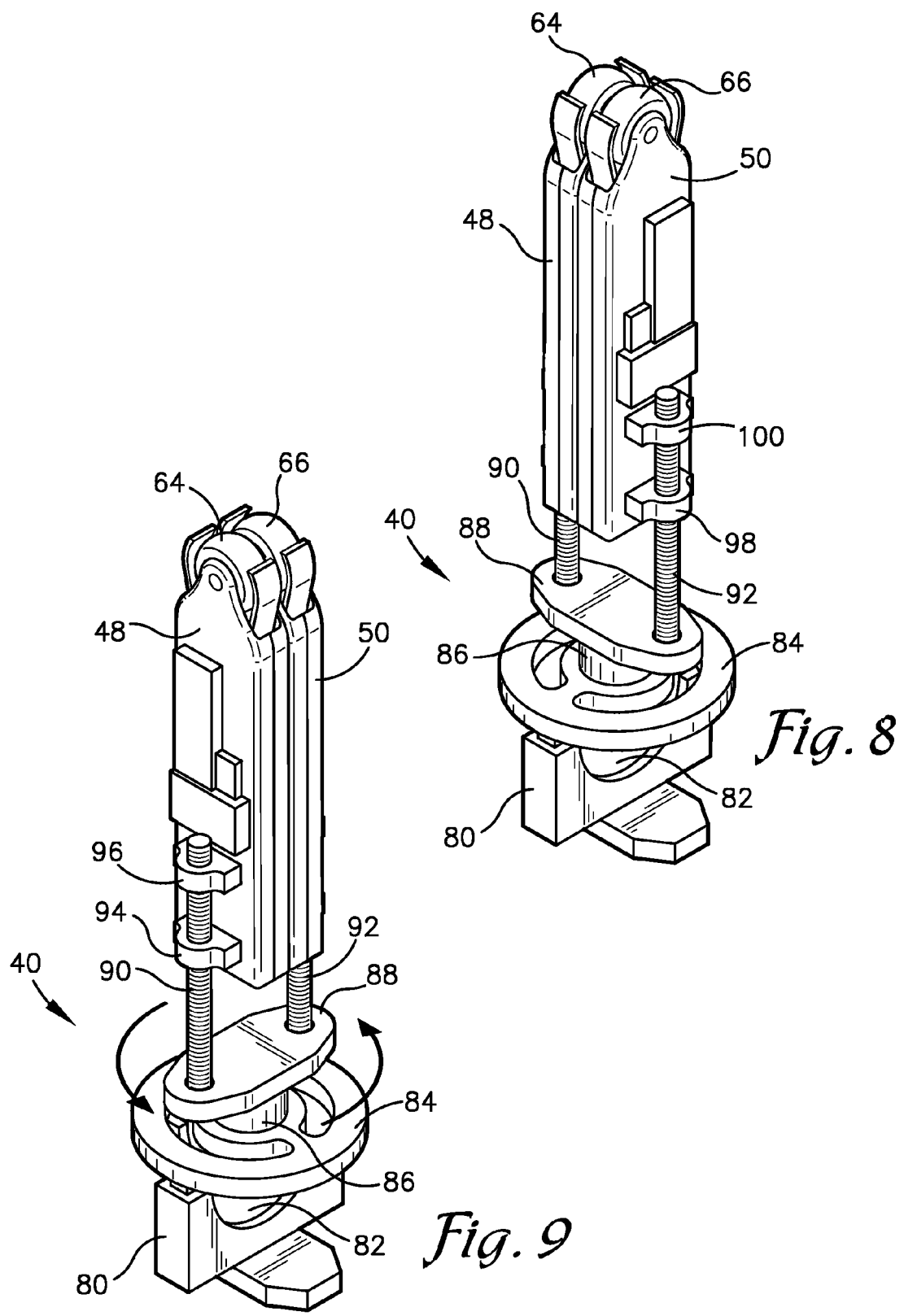

MATERIAL PLACEMENT METHOD AND APPARATUS

BACKGROUND

1. Field

The present invention relates to structural and aerodynamic aircraft parts. More particularly, the present invention relates to material dispensing and compaction, such as composite tape automated fiber placement (AFP).

2. Related Art

Fiber placement is a method of compacting a resin-impregnated composite material, also referred to as prepreg tow, onto a surface of an item such as a tool surface, mold, mandrel, or any surface used to form composite parts. In a typical fiber placement method, multiple layers of the composite material are compacted together and cured to form a strong, light-weight component of a pre-determined shape for use in the construction of aircrafts, missiles, satellites, automobiles, etc.

According to traditional fiber placement methods, multiple pieces of composite material are typically compacted simultaneously to the surface using one larger roller or segmented roller which rotates on a single shaft. However, since the roller or roller segments rotate around a single shaft, compacting material onto the surface over sharp angles or complex contours is challenging. For example, as a wide roller or a segmented roller rolls over certain complex contours, a portion of the roller makes no contact against the surface, and a portion of the tape is not compacted. The portion of the material that is not compacted can result in delamination or porosity of the cured part formed by the material.

After dispensing and compacting material onto the surface in one direction, traditional fiber placement machines reverse directions by rotating an entire material placement head 180°. For example, in a typical application, a material placement head dispenses and compacts material onto a surface in one direction, then cuts the material. After this, the material placement head continues traveling a specified roll-off distance and then retracts from the surface. Then the material placement head rotates 180°, reapproaches the surface, engages the surface, and dispenses and compacts the material to the surface, traveling in the opposite direction. Because of the many thousands of strands required for a typical composite part, this retract-rotate-reapproach method can add a significant amount of time to the material application process.

Current rollers known in the art for compacting composite material are flat from edge to edge. Therefore, in order to apply an equal amount of pressure to an entire strip of tape during compaction, the roller must remain perpendicular to the surface. This can be challenging or sometimes impossible to achieve depending on the complexity of the contours required for a given part.

Accordingly, there is a need for an improved method of dispensing and compacting material to a surface that does not suffer from the problems and limitations of the prior art.

SUMMARY

The present invention provides an improved material placement system and method for dispensing and compacting material, such as prepreg tow, onto a surface, such as a mold surface, a mandrel surface, or any surface used to form composite parts.

In various embodiments of the invention, the placement head comprises a first roller supported by a base for applying a first portion of the material along a first path of the surface; a second roller supported by the base for applying a second portion of the material along a second path of the surface; and a first actuator for moving the first roller relative to the base and independently of the second roller, thereby allowing both the first roller and the second roller to remain in contact with the surface as a first distance between the base and the first path changes relative to a second distance between the base and the second path.

In other embodiments of the invention, the first path is substantially adjacent the second path, and the first actuator moves the first roller between a first position closer to the base and a second position farther from the base. Furthermore, the first actuator may pivot the first roller about a first axis, and rotate the first roller about a second axis, the second axis being substantially perpendicular to the first axis. The roller assemblies may be coupled to the base in a substantially staggered configuration. Each roller assembly comprises a compaction roller and may dispense and compact a portion of the material to a portion of the surface and is independently rotatably, pivotally, and linearly moveable in six degrees of freedom.

In embodiments of the invention, the compaction roller of the roller assembly may be substantially crowned along its outer circumferential surface to more effectively dispense and compact the material to the surface. The compacting roller may be made of a malleable material such as rubber, allowing the crowned surface to compress against the surface as pressure is applied to the roller.

BRIEF DESCRIPTION OF THE DRAWINGS

An embodiment of the present invention is described in detail below with reference to the attached drawing figures, wherein:

FIG. 6 is an isometric view of a roller assembly pair of FIG. 3 and its actuator assembly;

FIG. 7 is an isometric view of one roller assembly pair of FIG. 3 and its actuator assembly, with one roller assembly actuated slightly higher than the other roller assembly;

FIG. 8 is an isometric view of one roller assembly pair of FIG. 3 and its actuator assembly;

FIG. 9 is an isometric view of one roller assembly pair of FIG. 3 and its actuator assembly, illustrating the rotational motion of a rotating actuator;

DETAILED DESCRIPTION

Figure 1:
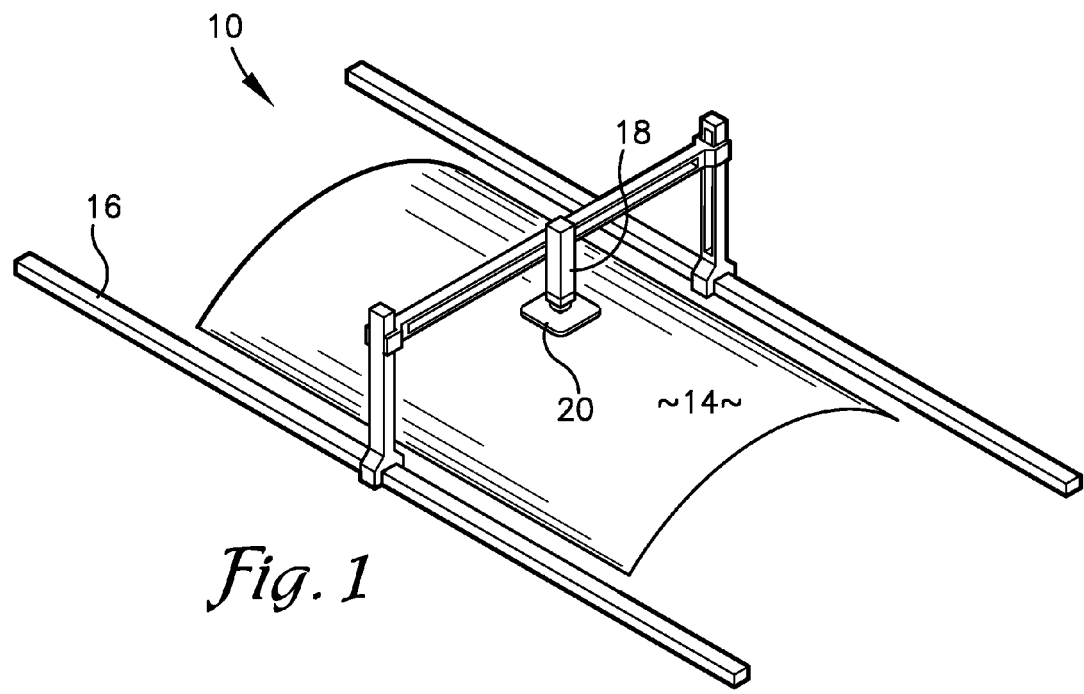
FIG. 1 is an isometric view of a material placement system and a placement head constructed in accordance with an embodiment of the present invention.

FIG. 1 illustrates a material placement system 10 constructed in accordance with an embodiment of the present invention. The material placement system 10 may be used for dispensing and compacting a material 12, illustrated in FIG. 2, onto a surface 14 of a mold, mandrel, or any apparatus for forming composite parts, and is particularly suited for fiber placement to construct composite parts for an aircraft. Referring to FIG. 1, the material placement system 10 may comprise a frame 16, a head actuator 18, and a placement head 20 attached to the frame 16 and actuated by the head actuator 18.

The frame 16 may be any structure known in the art for supporting a placement head 20, such as a gantry structure or a structure with curved or linear axes along which the placement head 20 may be moved relative to the frame 16 by the head actuator 18 or any other means known in the art. The head actuator 18 may be any actuator known in the art for moving an object along a frame. The head actuator 18 may move the placement head 20 along the frame 16 linearly and rotatably.

Figure 3:
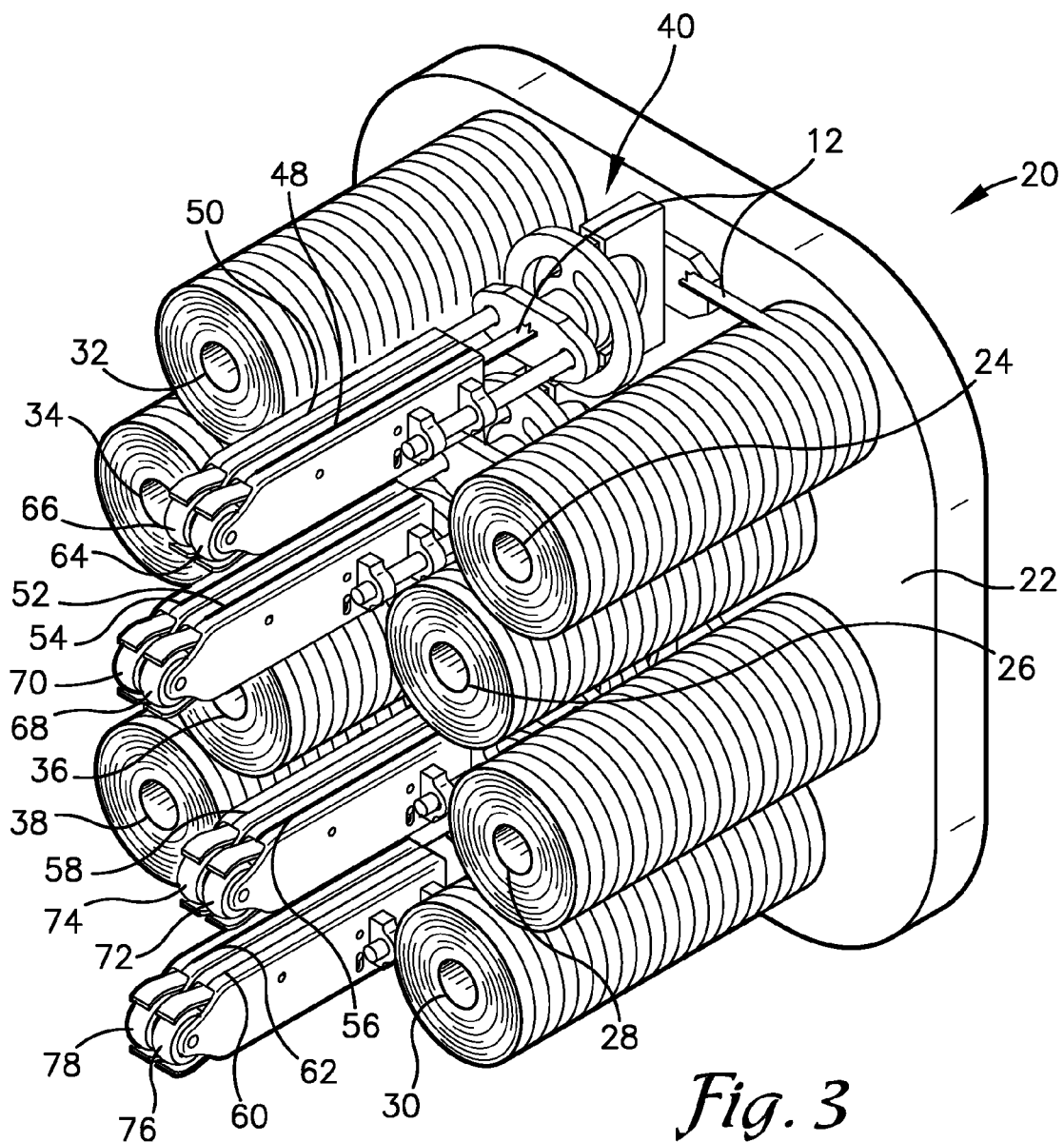
FIG. 3 is an isometric view of the placement head of FIG. 1.
Figure 4:
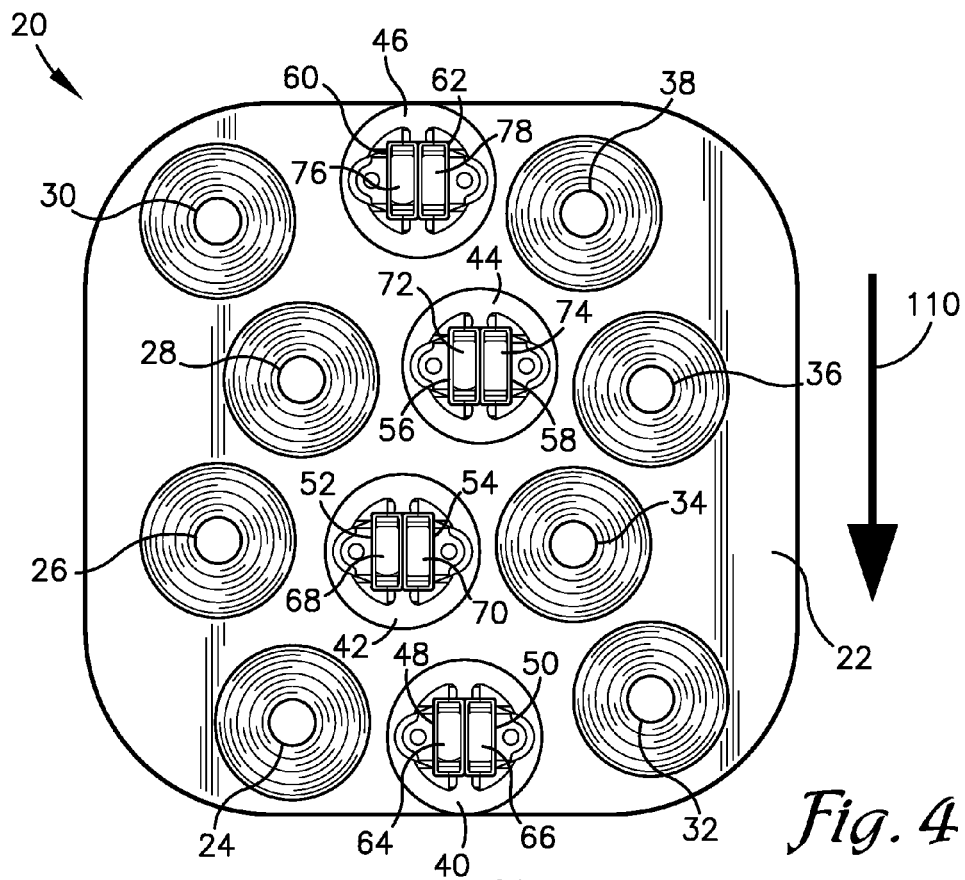
FIG. 4 is a plan view of the bottom of the placement head of FIG. 3.

As illustrated in FIGS. 3-4, an exemplary embodiment of the placement head 20 comprises: a base 22, attached to the frame 16, for supporting other components; a plurality of spools 24,26,28,30,32,34,36,38 fixed to the base 22; a plurality of actuator assemblies 40,42,44,46 fixed to the base 22; a plurality of roller assemblies 48,50,52,54,56,58,60,62 actuated by and coupled with the actuator assemblies and each comprising a compacting roller 64,66,68,70,72,74,76,78; and a control system (not shown) for guiding the placement head 20 and independently actuating the roller assemblies to dispense and compact the material 12 onto the surface 14.

Referring to FIGS. 2-5, the base 22 is a support to which the spools 24-38 and the actuator assemblies 40-46 are fixed. The base 22 may be planar and generally rectangular-shaped and may attach to the frame 16 or any machine known in the art for moving a placement head 20 along any surface.

Figure 2:
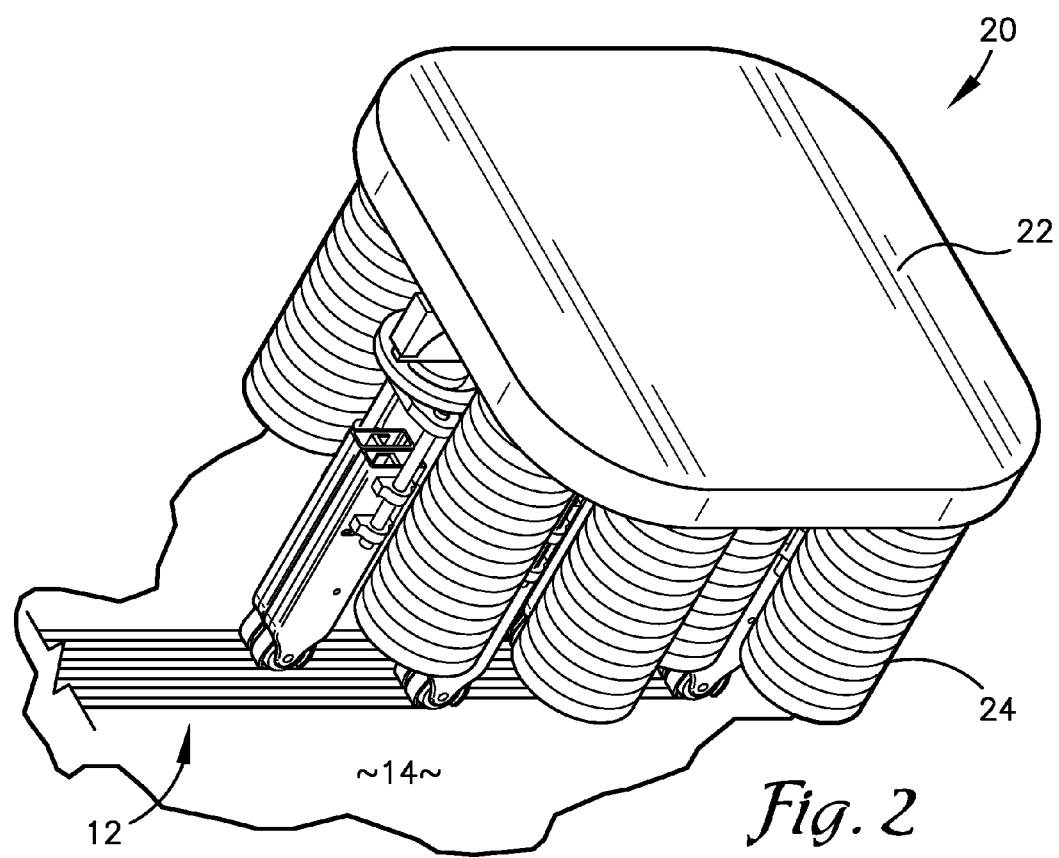
FIG. 2 is a perspective view of the placement head of FIG. 1 applying strips of a material to a surface.

The spools 24-38 are conventional and are each wound with elongated strips of the material 12 to be fed into at least one of the roller assemblies 48-62, each roller assembly dispensing and compacting a plurality of lengths of the material 12 to the surface 14, as illustrated in FIG. 2. The plurality of lengths of the material 12 may have a width within the range of from one sixteenth of an inch to one inch. The material 12 may be composite material, resin-impregnated composite tape, slit tape tow, any material known in the art for fiber placement, or any other formable material. In an exemplary embodiment, the spools are 18 inches long. The number of spools on the placement head 20 may be equal to the number of roller assemblies of the placement head 20. For example, as illustrated in FIG. 3, eight spools may feed material to eight roller assemblies. Material 12 from each spool may be inserted directly into the roller assemblies or may be directed to the roller assemblies by redirect rollers (not shown) or other methods well known in the art.

Figure 5:
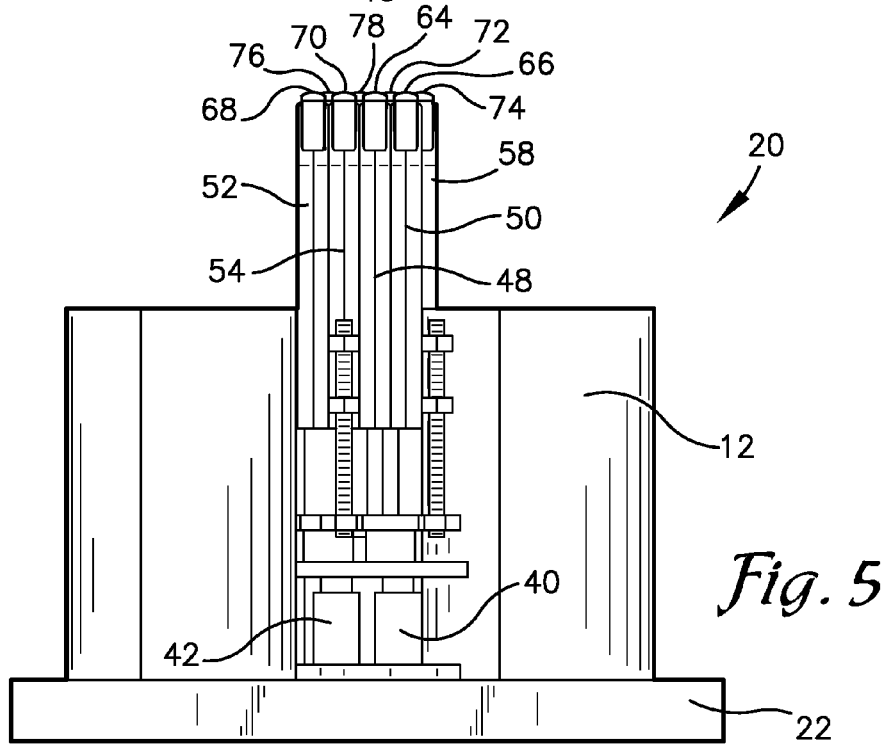
FIG. 5 is a plan view of one side of the placement head of FIG. 3.

Each of the actuator assemblies 40-46 may couple at least one or two roller assemblies 48-62 to the base 22. Referring to FIGS. 6-10, each actuator assembly may comprise an actuator mount 80 attached to the base 22, a pivoting actuator 82 pivotally attached to the actuator mount 80, and an actuator support 84 rotatably or fixedly attached to the pivoting actuator 82. Each actuator assembly may further comprise a rotating actuator 86 rotatably attached to the actuator support 84, a rod mount 88 fixedly attached to the rotating actuator 86, and a first rod 90 and a second rod 92 slidably attached to the rod mount 88. Finally, each actuator assembly may also comprise four rod guides 94,96,98,100, two rod guides slidably attached to the first rod 90 and two rod guides slidably attached to the second rod 92. The first and second rods 90,92 may include screw threads spiraled around an elongated outer surface of the rods 90,92, as illustrated in FIGS. 4-5, wherein rotational motion of the rods 90,92 allows the first and second rod 90,92 to slide relative to the rod mount 88 or the rod guides 94-100. Although the actuator assemblies have been described with reference to the embodiments illustrated in the attached drawings, it is noted that equivalents may be employed and substitutions made herein without departing from the scope of the invention as recited in the claims. For example, each actuator assembly may alternatively comprise a single roller assembly actuator for actuating the roller assemblies.

Each of the roller assemblies 48-62 may be attached to at least one of the first rod 90 and the second rod 92 by the rod guides 94-100. In one embodiment of the invention, at least one of the actuator assemblies 40 may attach to a first pair of roller assemblies 48,50, as illustrated in FIGS. 6-9. Additionally, actuator assembly 42 may attach to a second pair of roller assemblies 52,54, actuator assembly 44 may attach to a third pair of roller assemblies 56,58, and actuator assembly 46 may attach to a fourth pair of roller assemblies 60,62. The space between the compacting rollers of each roller assembly pair may be approximately equal to the width of a strip of the material 12, as illustrated in FIGS. 5-7. For example, the space between the compacting roller 64 and the compacting roller 66 may be approximately equal to the width of a strip of the material 12. In one embodiment, when two roller assemblies are attached to each actuator assembly, two rod guides 94,96 may attach to one roller assembly 48 and two rod guides 98,100 may attach to the other roller assembly 50.

The actuator assemblies 40-46 may be arranged in a substantially staggered configuration on the base 22. Referring to FIG. 4, the actuator assemblies are staggered in a zig-zag configuration, with each of the plurality of actuator assemblies positioned behind and to one side of a preceding actuator assembly. The distance between any two of the plurality of compacting rollers of the placement head 20 may be within the range of from one-sixteenth of an inch to twenty inches. In this staggered configuration, illustrated in FIGS. 3-5, the roller assemblies 48-62 of the placement head 20, coupled with the actuator assemblies, dispense material 12 substantially simultaneously along substantially adjacent paths on the surface 14, as illustrated in FIG. 2. In various embodiments of the invention, there may be small gaps between the adjacent paths of material 12. Alternatively, the paths of the material 12 may partially overlap, with at least one edge of at least one strip of material overlapping a portion of another strip of material.

For example, in one embodiment illustrated in FIGS. 3-5, four actuator assemblies 40-46 each couple one of the roller assembly pairs to the base 22. In this configuration, the first roller assembly pair 48,50 is forward of the second roller assembly pair 52,54, the second roller assembly pair 52,54 is forward of the third roller assembly pair 56,58, and the third roller assembly pair 56,58 is forward of the fourth roller assembly pair 60,62. The second roller assembly pair 52,54 is left of the first roller assembly pair 48,50, the third roller assembly pair 56,58 is right of the second roller assembly pair 52,54, and the fourth roller assembly pair 60,62 is left of the third roller assembly pair 56,58.

If the placement head 20 moves in a direction indicated by an arrow 110 in FIG. 4, adjacent paths of the material 12 may be compacted to the surface 14 by the following compacting rollers, listed here in order from left to right: the compacting roller 68, the compacting roller 76, the compacting roller 70, the compacting roller 78, the compacting roller 64, the compacting roller 72, the compacting roller 66, and the compacting roller 74. For example, in this configuration, one side edge of a path of material compacted by the compacting roller 76 is adjacent a side edge of a path of material compacted by the compacting roller 68, while an other side edge of the path of material compacted by the compacting roller 76 is adjacent a side edge of a path of material compacted by the compacting roller 70.

Each of the roller assemblies 48-62 may be constructed in a substantially identical manner with substantially identical components. Referring to FIGS. 11-18, the roller assembly 50 may comprise: the compacting roller 66 having an outer circumferential surface 112 for compacting the material 12; a first guide element 114 with a first end 116 and a second end 118 for directing the material 12 to the compacting roller 66; a second guide element 120 presenting a first guide surface 122 that generally follows a first portion of the outer circumferential surface 112 of the compacting roller 66; and a third guide element 124 presenting a second guide surface 126 that generally follows a second portion of the outer circumferential surface 112 of the compacting roller 66.

Referring to FIGS. 11-14, the roller assembly 50 may further comprise a first feeding roller 128 and a second feeding roller 130 for cooperatively feeding the material 12 to the first guide element 114; a fourth guide element 132 for guiding the material 12 to the first and second feeding rollers 128, 130; a cutting mechanism 134 for cutting the material 12; an external casing 136 enclosing the roller assembly 50 components; and a guiding actuator 138, a feeding actuator 140, and a cutting actuator 142 mounted to the external casing 136 for actuating the first guide element 114, the first and second feeding rollers 128, 130, and cutting mechanism 134.

Figure 11:
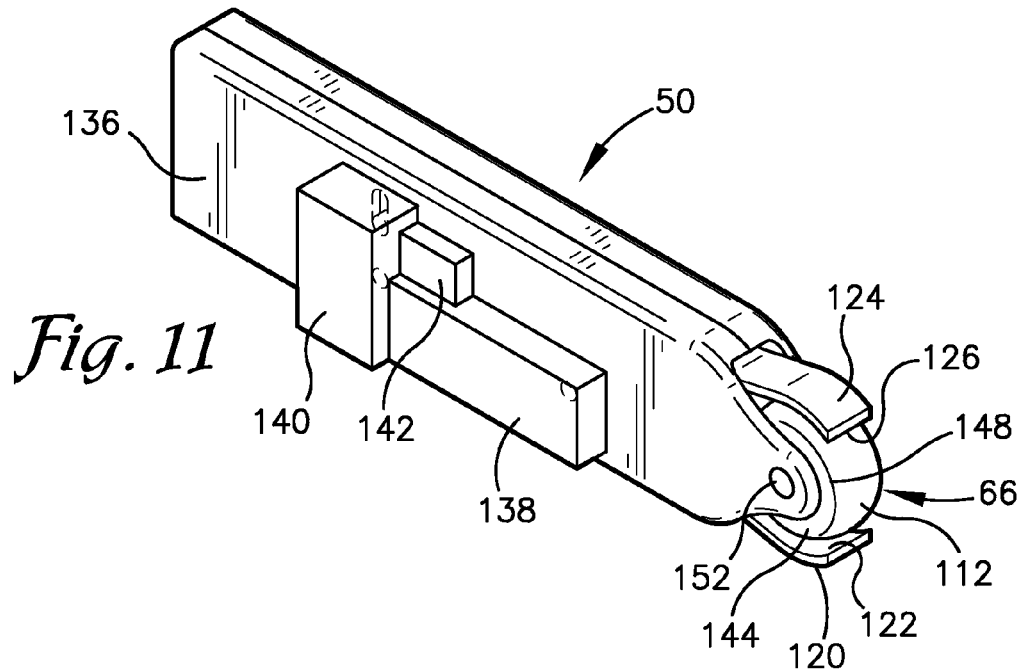
FIG. 11 is an isometric view of a roller assembly constructed in accordance with an embodiment of the present invention.
Figure 12:
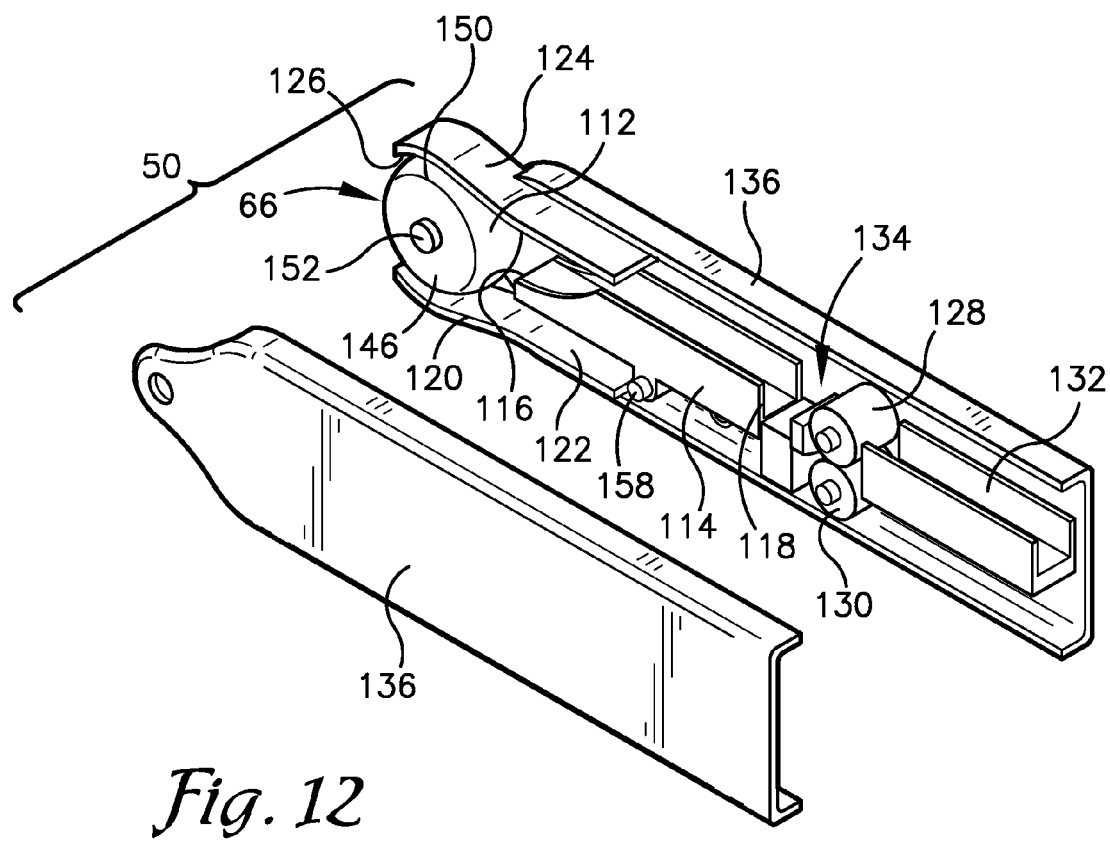
FIG. 12 is an exploded view of the roller assembly of FIG. 11.

Referring to FIGS. 11-12, the compacting roller 66 may comprise a first face 144, a second face 146, a first edge 148 along the circumference of the first face 144, and a second edge 150 along the circumference of the second face 146. Additionally, the outer circumferential surface 112, interposed between the first edge 148 and the second edge 150, is substantially crowned from the first edge 148 to the second edge 150, such that a portion of the outer circumferential surface 112 farthest from a rotational axis 152 of the compacting roller 66 is approximately half-way between the first edge 148 and the second edge 150. The compacting roller 66 is made of a substantially malleable material, such as any kind of rubber known in the art for compacting composite material to any surface. This allows the compacting roller 66 to engage the surface 14 at a 90° angle or at non-90° angles, since the compacting roller 66 can conform to the surface 14 as it is pressed against the surface 14.

Figure 19:
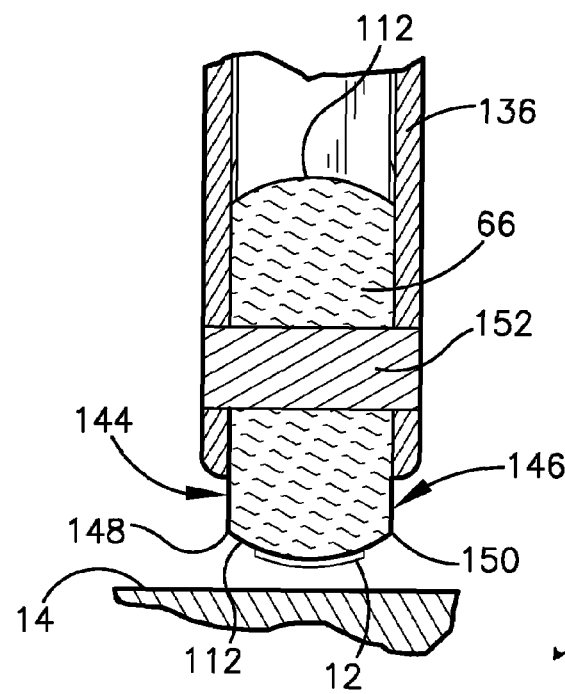
FIG. 19 is a cross-sectional view of a compacting roller constructed in accordance with an embodiment of the present invention, wherein the compacting roller is not biased against a surface.
Figure 20:
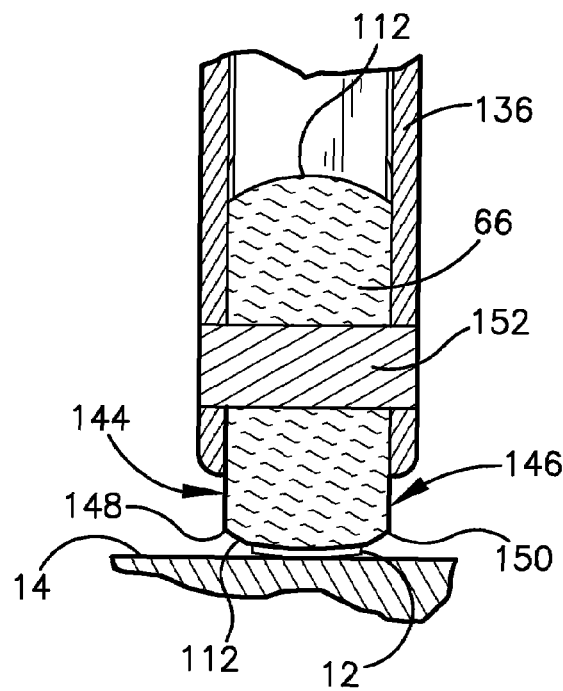
FIG. 20 is a cross-sectional view of the compacting roller of FIG. 19 biased against the material and the surface, with pressure applied to the roller toward the surface.
Figure 21:
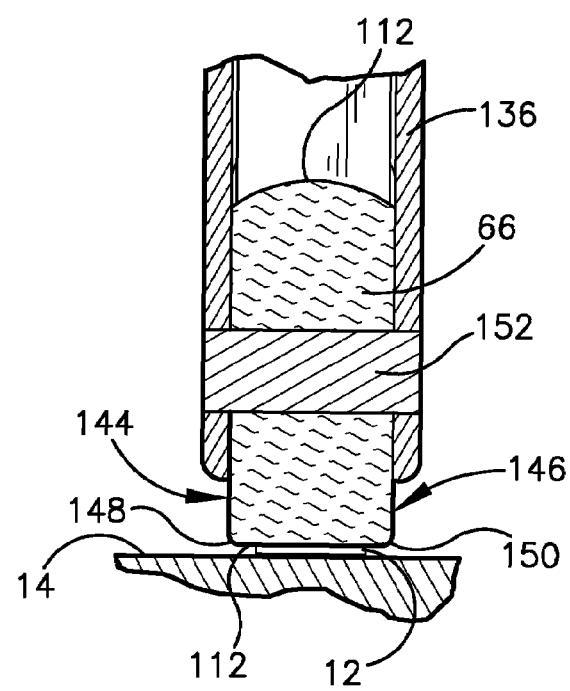
FIG. 21 is a cross-sectional view of the compacting roller of FIG. 19 biased against the material and the surface, with enough pressure applied to the roller toward the surface to substantially flatten an outer circumferential surface of the compacting roller.

For example, in FIG. 19, the compacting roller 66 is moved toward the surface 14. When the compacting roller 66 is pressed against the surface 14 at a 90° angle, the portion of the outer circumferential surface 112 farthest from the rotational axis 152 of the compacting roller 66 is biased against the material 12 and the surface 14, as illustrated in FIG. 20. Referring to FIG. 21, as additional pressure is applied, the outer circumferential surface 112 may compress until it is substantially flat, thereby exacting pressure first at the center of the strip of the material 12 and then from the center out to the side edges of the strip of the material 12, thereby evenly compacting the material 12 onto the surface 14.

The compacting roller 66 may be any size required by a particular material placement application. For example, the compacting roller 66 may be between 0.01 inches and 15 inches wide. The compacting roller 66 may further be between 0.1 inches and 2 inches wide. The compacting roller 66 may further be between 0.125 inches and 3 inches wide. The compacting roller may be wider than the strips of material 12. For example, a strip of material 0.25 inches wide may be applied by a roller that is 0.75 inches wide. The first face 144 and the second face 146 of the compacting roller 66 may have a diameter in the range of from about 0.1 inches to about 15 inches. The first face 144 and the second face 146 of the compacting roller 66 may further have a diameter in the range of from about 0.50 inches to about 3 inch. In an exemplary embodiment illustrated in FIG. 12, to compact a quarter-inch strip of the material 12 onto the surface 14, the compacting roller 66 may have a diameter of 0.750 inches and a width of 0.375 inches.

In various embodiments, the first guide element 114 is proximate the compacting roller 66 and movable between the first position and the second position. In the first position, illustrated in FIGS. 15-16, the first end 116 of the first guide element 114 is proximate the second guide element 120. In the second position, illustrated in FIGS. 17-18, the first end 116 of the first guide element 114 is proximate the third guide element 124. In one embodiment, the first guide element 114 may be pivotable about a pivot 158, whereby the first guide element 114 may pivot to the first position and to the second position. However, any means of moving the first guide element 114 from the first position to the second position may be employed.

The second guide element 120 presents the first guide surface 122 that generally follows a first portion of the outer circumferential surface 112 of the compacting roller 66 and the third guide element 124 presents the second guide surface 126 that generally follows a second portion of the outer circumferential surface 112 of the compacting roller 66, as illustrated in FIGS. 11-12. The first portion of the outer circumferential surface 112 is generally opposed to the second portion of the outer circumferential surface 112. The second and third guide elements 120,124 may be curved in shape to direct the material 12 around the compacting roller 66. Specifically, at least a portion of the second and third guide elements 120,124 may be curved to match a portion of the circumference of the compacting roller 66.

Figure 17:
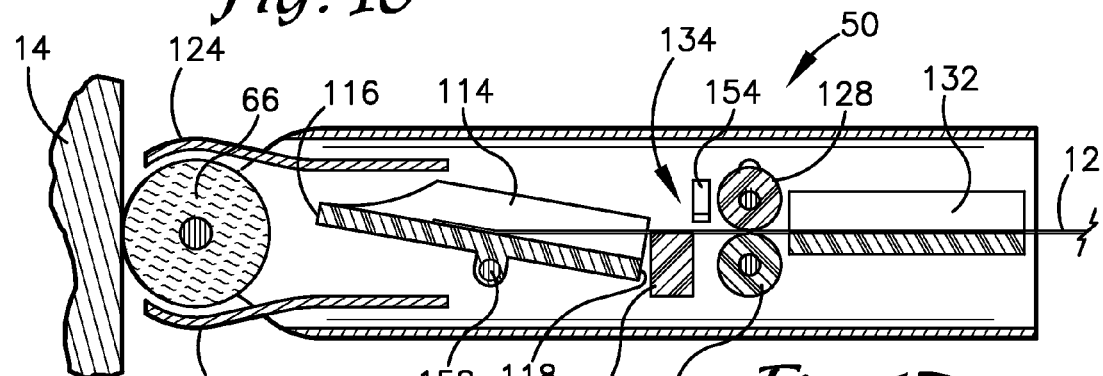
FIG. 17 is a cross-sectional plan view of the roller assembly of FIG. 11, with the material being fed to a second side of the compacting roller.

In various embodiments, the first feeding roller 128 is biased against the second feeding roller 130 with the material 12 disposed therebetween, as illustrated in FIG. 17. When at least one of the first and second feeding rollers 128,130 is actuated to rotate, the material 12 may be cooperatively fed to the first guide element 114. Additionally, at least one of the first and second feeding rollers 128,130 may be actuated to move toward and away from the other of the first and second feeding rollers 128,130. The fourth guide element 132 may be stationary and positioned proximate the first and second feeding rollers 128,130 to guide the material 12 to the first and second feeding rollers 128,130.

Figure 13:
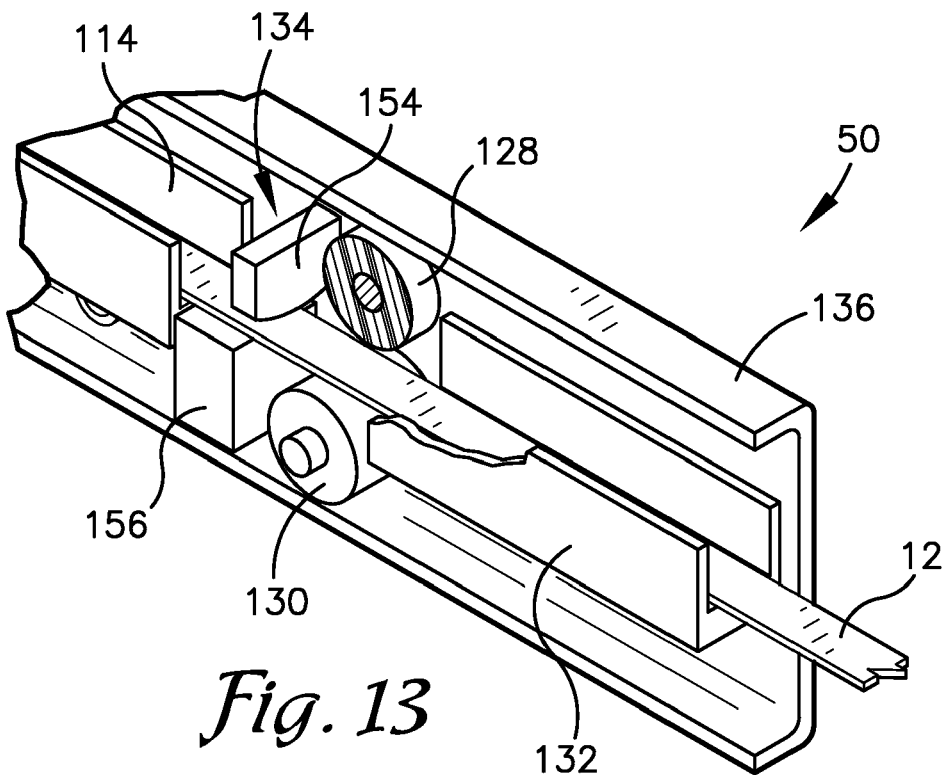
FIG. 13 is a fragmentary, cross-sectional, isometric view of the roller assembly of FIG. 11, wherein a cutting mechanism is in an open position.
Figure 14:
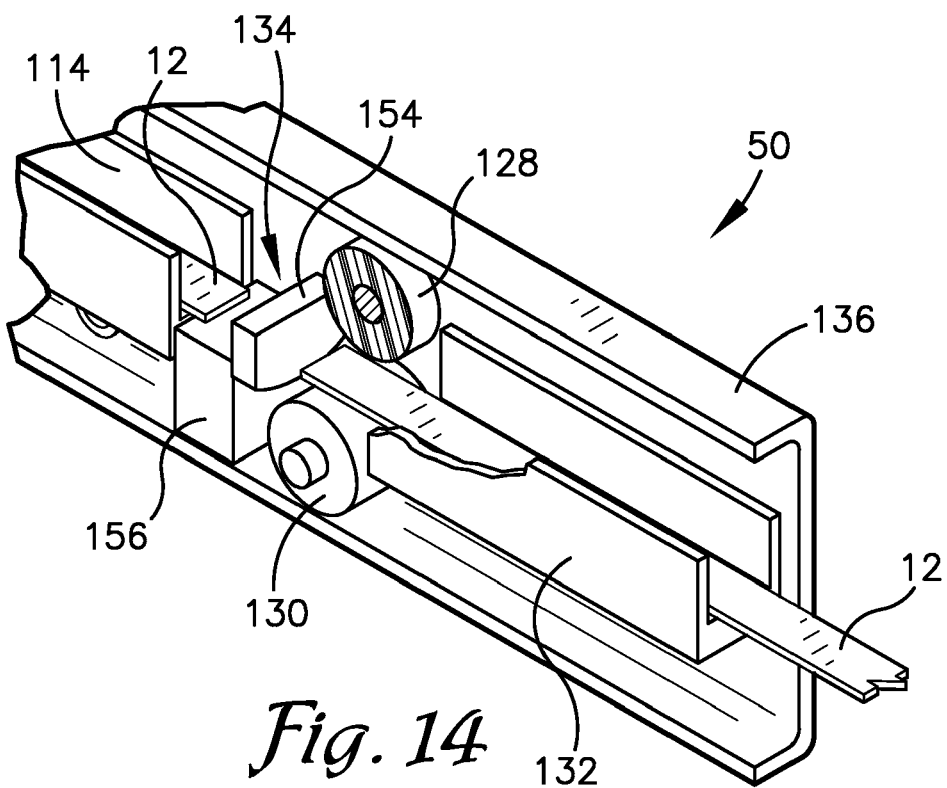
FIG. 14 is a fragmentary, cross-sectional, isometric view of the roller assembly of FIG. 11, wherein the cutting mechanism is in a closed position, thereby cutting the material.

Referring to FIGS. 13-14, the roller assembly 50 may also include the cutting mechanism 134 for cutting the material 12. The cutting mechanism 134 may be any cutting mechanism known in the art for cutting material. In one embodiment, the cutting mechanism 134 comprises a first cutting element 154 and a second cutting element 156. In an open position, the first cutting element 154 is moved away from the second cutting element 156, as illustrated in FIG. 13. The cutting mechanism 134 may generally remain in an open position to allow the material 12 to flow through it. Referring to FIG. 14, when the material 12 requires cutting, the cutting mechanism 134 can be closed by any means known in the art, such as the cutting actuator 142, illustrated in FIG. 11.

In various embodiments, the cutting mechanism 134, the first feeding roller 128, and the second feeding roller 130 are interposed between the first guide element 114 and the fourth guide element 132. Additionally, the cutting mechanism 134 may be located between the first guide element 114 and the first and second feeding rollers 128,130, so that when the material 12 is cut, a portion of the material 12 will remain between the first feeding roller 128 and the second feeding roller 130.

Referring to FIGS. 11-12, the external casing 136 encloses the first guide element 114, the cutting mechanism 134, the first feeding roller 128, the second feeding roller 130, and the fourth guide element 132. The external casing 136 may also encompass a portion of the second guide element 120, the third guide element 124, and the compacting roller 66. Furthermore, the rotational axis 152, about which the compacting roller 66 rotates, may be secured to the external casing 136.

The guiding actuator 138, the feeding actuator 140, and the cutting actuator 142 may be mounted onto the external casing 136, as illustrated in FIG. 11. For roller assembly pairs, such as the roller assemblies 48,50, the guiding, feeding, and cutting actuators 138,140,142 are mounted on the external casing 136 of each roller assembly 48,50 on an external surface facing away from the other of the two roller assemblies 48,50, as illustrated in FIGS. 8-9. The guiding actuator 138 may move the first guide element 114 between the first position and the second position. The feeding actuator 140 may rotate at least one of the first and second feeding rollers 128,130 and may move one of the first and second feeding rollers 128,130 toward and away from the other of the first and second feeding rollers 128,130. The cutting actuator 142 may close and open the cutting mechanism 134.

The control system of the placement head 20 may be any control system known in the art for sending and receiving electronic signals. The control system is programmable to communicate with any of the actuators 40-46,138-142 and the roller assemblies 48-62. The control system may control one of the actuator assemblies independently of another of the actuator assemblies, thereby allowing independent movement of each roller assembly in up to six degrees of freedom, three linear and up to three rotary. So, for example, each roller assembly may move linearly in both directions along each of an X-axis, Y-axis, and Z-axis, and rotatably about an X-axis, Y-axis, and/or Z-axis. The control system may also monitor each roller assembly individually for errors within the material 12 or the roller assembly.

Figure 10:
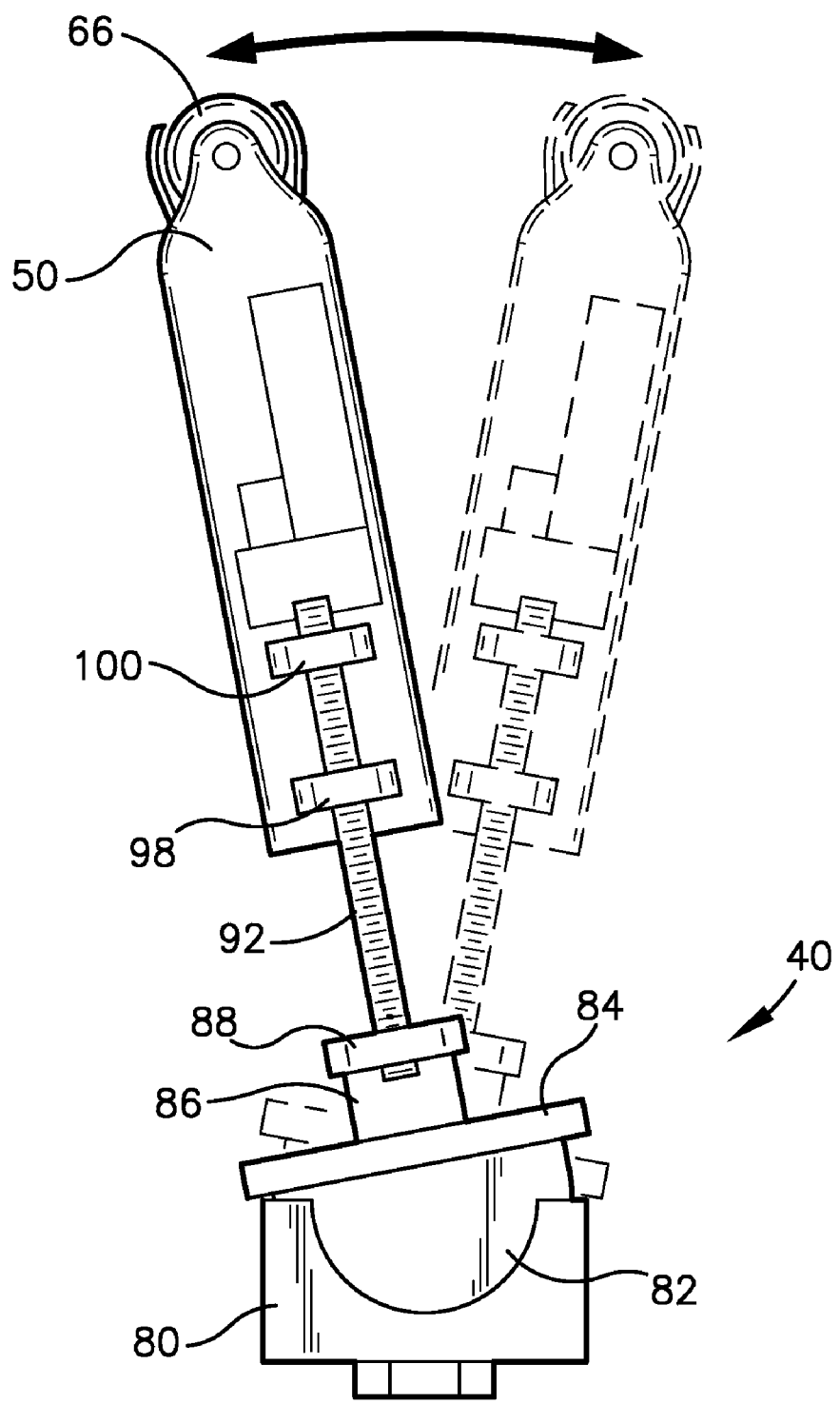
FIG. 10 is a side view of one roller assembly pair of FIG. 3 and its actuator assembly, wherein the motion of a pivoting actuator is illustrated.

In an exemplary embodiment, the control system may command one pivoting actuator 82 of the actuator assembly 40 to pivot the first roller assembly pair 48,50 about a first axis, as illustrated in FIG. 10, independent of the other actuator assemblies 42-46. The pivoting actuator 82 may pivot the first roller assembly pair 48,50 60° forward and 60° backward about the first axis. The control system may also command the rotating actuator 86 to rotate about a second axis, as illustrated in FIG. 8-9, thereby orienting the first roller assembly pair 48,50 in a different direction than the other roller assembly pairs of the placement head 20. The first axis may be substantially perpendicular to the second axis.

In various embodiments, the control system may also command at least one of the roller assemblies 48-62 to slide closer to or further from the base 22 than at least one other roller assembly, independently of the other roller assemblies 48-62 of the placement head 20. For example, the second rod 92 of the first roller assembly pair 48,50 may be commanded by the control system to slide the roller assembly 50 away from the base 22, thereby extending the roller assembly 50 farther away from the base 22 than the roller assembly 48, as illustrated in FIGS. 6-7. Then the control system may command the second rod 92 to slide the roller assembly 50 back to a position closer to the base 22. Additionally, the control system may command both rollers of the first roller assembly pair 48,50 to slide closer to or further from the base 22 simultaneously.

Individual control and movement of the roller assemblies 48-62 allows the material 12 to be uniformly compacted onto the surface 14 more efficiently and effectively than prior art material application methods, because the multi-directional individual freedom of movement allows the roller assemblies to better conform to tight radii and complex contours of the surface 14. This allows continuous contact of the compacting rollers 64-78 and the material 12 with the surface 14.

A method for individual control and movement of the roller assemblies 48-62 comprises: feeding a plurality of portions of the material 12 through a plurality of the roller assemblies of a placement head 20; substantially simultaneously applying the plurality of portions of the material 12 to the surface 14 with the plurality of roller assemblies such that the portions of the material 12 are applied to adjacent paths on the surface 14; and moving each roller assembly in six degrees of freedom independently of the other roller assemblies to dispense and compact the material 12 to the surface 14, as illustrated in FIGS. 2-3.

For example, referring to FIGS. 6-7 the method may include moving at least one compacting roller 66 between a position closer to a base 22 of the placement head 20 and a position farther from the base 22 of the placement head 20, independently of the other compacting rollers, to apply the material 12 to the surface 14. As illustrated in FIGS. 8-10, the method may also further comprising pivoting at least one roller assembly 50 about a first axis and rotating the same roller assembly 50 about a second axis, the second axis being substantially perpendicular to the first axis.

The method may further comprise tilting at least one of the roller assemblies 48-62 at a different angle relative to the base 22 from the other roller assemblies. The method may also further comprise tilting at least one of the roller assemblies at non-90° angles relative to the surface 14. Additionally, the method may comprise staggering adjacent roller assemblies 48-62 or roller assembly pairs and substantially simultaneously moving the roller assemblies 48-62 along adjacent paths on the surface 14.

Figure 15:
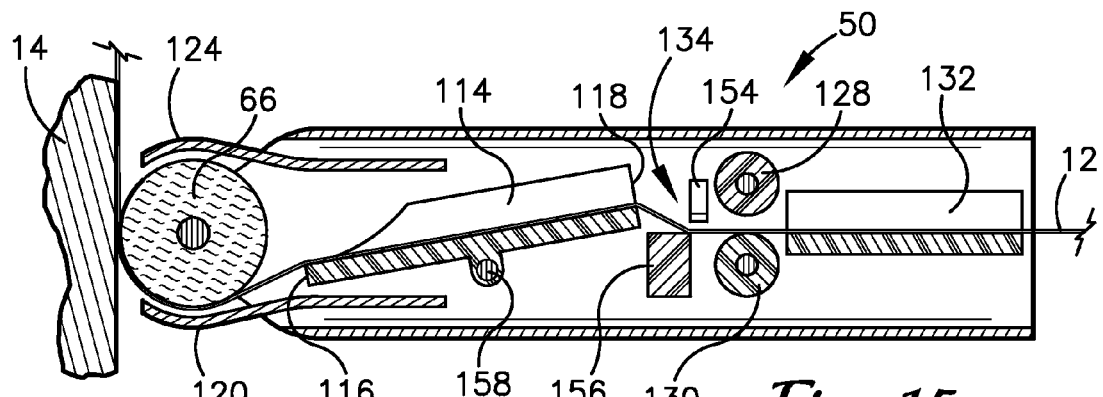
FIG. 15 is a cross-sectional plan view of the roller assembly of FIG. 11, with the material being dispensed in a first direction along a surface.

Another method of the present invention allows the material 12 to be bidirectionally dispensed and compacted to the surface 14 with out requiring the roller assemblies 48-62 or placement head 20 to rotate 180°. The method, illustrated in FIGS. 15-18, comprises the steps of moving the first guide element 114 of the roller assembly 50 to the first position; feeding the material 12 through the first guide element 114 such that the material 12 engages the second guide element 120 proximate the first side of the compacting roller 66; urging the compacting roller 66 toward the surface 14 such that the compacting roller 66 presses the material 12 against the surface 14; and moving one of the compacting roller 66 and the surface 14 in a first direction relative to the other of the compacting roller 66 and the surface 14, thereby dispensing and compacting the material 12 onto the surface 14 along the first direction, as illustrated in FIG. 15.

Figure 18:
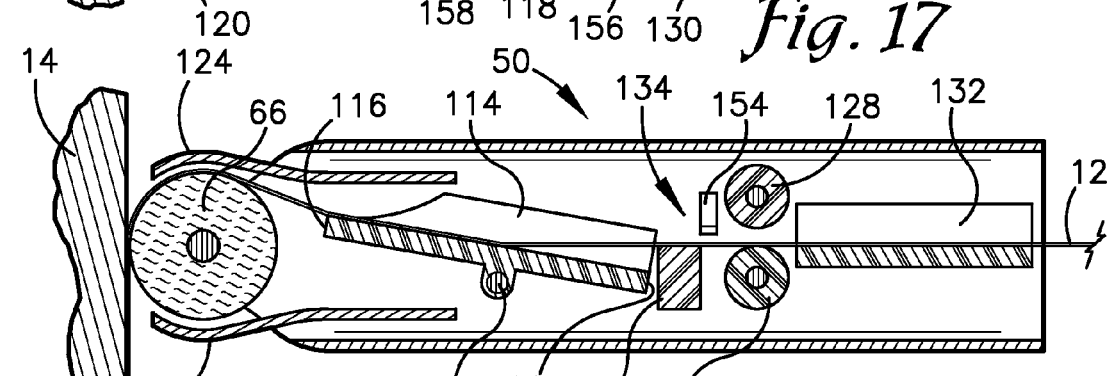
FIG. 18 is a cross-sectional plan view of the roller assembly of FIG. 11, with the material being dispensed in a second direction along the surface.

The method further comprises moving the first guide element 114 to the second position; feeding the material 12 through the first guide element 114 such that the material 12 engages the third guide element 124 proximate the second side of the compacting roller 66; urging the compacting roller 66 toward the surface 14 such that the compacting roller 66 presses the material 12 against the surface 14; and moving one of the compacting roller 66 and the surface 14 in a second direction relative to the other of the compacting roller 66 and the surface 14, thereby dispensing and compacting the material 12 onto the surface 14 along the second direction, as illustrated in FIG. 18.

The method may further comprise biasing the first feeding roller 128 and the second feeding roller 130 against each other, with the material 12 interposed therebetween, and rotating at least one of the first feeding roller 128 and the second feeding roller 130, thereby cooperatively feeding the material 12 through the fourth guide element 132, the open cutting mechanism 134, the first guide element 114, and the second guide element 120. When the material 12 engages the compacting roller 66 and the surface 14, the first feeding roller 128 and the second feeding roller 130 may disengage the material 12 by moving at least one of the first feeding roller 128 and the second feeding roller 130 away from the other of the first feeding roller 128 and the second feeding roller 130. Then the material 12 may be dispensed and compacted onto the surface 14 in the first direction.

Figure 16:
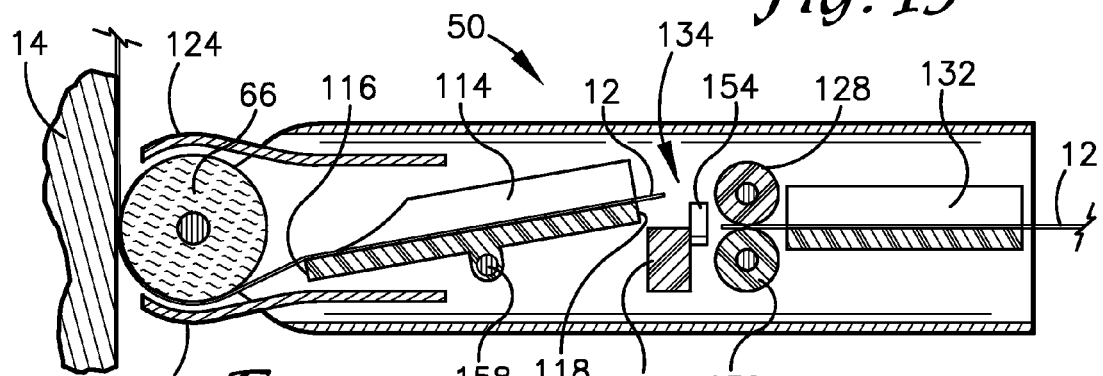
FIG. 16 is a cross-sectional plan view of the roller assembly of FIG. 11, with the material being cut by the cutting mechanism.

Referring to FIG. 16, the method may further comprise cutting the material 12 with the cutting mechanism 134 when the material 12 has been compacted to a predetermined portion of the surface 14 in the first direction. After the material 12 is cut, at least one of the first feeding roller 128 and the second feeding roller 130 may be moved toward the other of the first feeding roller 128 and the second feeding roller 130, biasing the first feeding roller 128 against the second feeding roller 130, with the material 12 interposed therebetween, as illustrated in FIG. 16. Referring to FIG. 17, the method may then involve actuating at least one of the first feeding roller 128 and the second feeding roller 130 to rotate, causing both the first feeding roller 128 and the second feeding roller 130 to rotate toward each other to feed the material 12 through the open cutting mechanism 134, to the first guide element 114, and then to the third guide element 124. Once the material 12 engages both the compacting roller 66 and the surface 14, at least one of the first feeding roller 128 and the second feeding roller 130 may be moved away from the other of the first feeding roller 128 and the second feeding roller 130, thereby disengaging the material 12. Then the material 12 may be dispensed and compacted onto the surface 14 in the second direction, as illustrated in FIG. 18.

Although the invention has been described with reference to the embodiments illustrated in the attached drawings, it is noted that equivalents may be employed and substitutions made herein without departing from the scope of the invention as recited in the claims. For example, in various embodiments, the roller assemblies 48-62 of the invention described above could be replaced with any roller suitable for compacting material 12 to any surface. Additionally, each of the roller assemblies, compacting rollers, and actuator assemblies of the placement head 20 may be constructed and actuated as illustrated in FIGS. 6-21.

Having thus described an embodiment of the invention, what is claimed as new and desired to be protected by Letters Patent includes the following:

1. A placement head for applying a plurality of lengths of a material to a surface, said placement head comprising:
   a base;
   a first roller assembly supported by the base and including a first roller for applying a first length of the material along a first path of the surface;
   a second roller assembly supported by the base and including a second roller for applying a second length of the material along a second path of the surface;
   a third roller assembly supported by the base and including a third roller for applying a third length of the material along a third path of the surface;
   a first actuator for moving the first roller assembly relative to the base and independently of the second roller assembly and the third roller assembly;
   a second actuator for moving the second roller assembly relative to the base and independently of the first roller assembly and the third roller assembly; and
   a third actuator for moving the third roller assembly relative to the base and independently of the first roller assembly and the second roller assembly,
   wherein the first actuator moves the first roller assembly in six-degrees of freedom independently of the second and third roller assemblies,
   wherein the second actuator moves the second roller assembly in six-degrees of freedom independently of the first and third roller assemblies,
   wherein the third actuator moves the third roller assembly in six-degrees of freedom independently of the first and second roller assemblies,
   wherein each roller assembly comprises:
      a first roller with an outer circumferential surface;
      a first guide element having a first end and a second end, the first guide element being movable between a first position and a second position;
      a second guide element presenting a first guide surface that generally follows a first portion of the outer circumferential surface of the first roller; and
      a third guide element presenting a second guide surface that generally follows a second portion of the outer circumferential surface of the first roller;
      wherein the first end of the first guide element is proximate the second guide element when the first guide element is in the first position, and is proximate the third guide element when the first guide element is in the second position.

2. The placement head as set forth in claim 1, wherein the first roller assembly, the second roller assembly, and the third roller assembly apply the plurality of lengths of the material substantially simultaneously.

3. The placement head as set forth in claim 1, wherein the first roller is made of a substantially malleable material and the outer circumferential surface of the first roller is substantially crowned between a first edge and a second edge, such that a portion of the outer circumferential surface farthest from a rotational axis of the first roller is approximately half-way between the first edge and the second edge.

4. A material placement system for applying a material to a surface, the system comprising:
   a frame;
   a material placement head supported by the frame, the head including—
      a base,
      a plurality of roller assemblies supported by the base, each roller assembly operable to apply a portion of the material to a portion of the surface, and
      a roller assembly actuator for moving at least one of the roller assemblies relative to the base and independently of the other roller assemblies;
   a head actuator for moving the head relative to the frame; and
   a control system for controlling the roller assembly actuator,
   wherein at least one of the roller assemblies comprise:
      a first roller with an outer circumferential surface;
      a first guide element having a first end and a second end, the first guide element being movable between a first position and a second position;
      a second guide element presenting a first guide surface that generally follows a first portion of the outer circumferential surface of the first roller; and
      a third guide element presenting a second guide surface that generally follows a second portion of the outer circumferential surface of the first roller;
      wherein the first end of the first guide element is proximate the second guide element when the first guide element is in the first position, and is proximate the third guide element when the first guide element is in the second position.

5. A material placement system set forth in claim 4, wherein the outer circumferential surface of the first roller is substantially crowned between a first edge and a second edge, such that a portion of the outer circumferential surface farthest from a rotational axis of the first roller is approximately half-way between the first edge and the second edge, and the first roller is made of a substantially malleable material.

6. A material placement system set forth in claim 4, wherein each roller assembly further comprises:
   a second roller;
   a third roller biased against the second roller; and
   a first actuator for rotating at least one of the second roller and third roller.

7. A material placement system set forth in claim 4, wherein the first guide element is pivotable about a pivot to the first position and to the second position.

* * * * *